United States Patent [19]

Owens

[11] 4,453,302
[45] Jun. 12, 1984

[54] APPARATUS FOR REUSING HIGH PRESSURE HOSE FITTINGS

[76] Inventor: Carl H. Owens, 1652 River Bluff Rd., Jacksonville, Fla. 32211

[21] Appl. No.: 298,168

[22] Filed: Aug. 31, 1981

[51] Int. Cl.³ .............................................. B23P 19/04
[52] U.S. Cl. .................................... 29/237; 29/403.3; 29/426.4
[58] Field of Search .................... 29/403.3, 527.2, 237, 29/426.4; 277/228

[56] References Cited

U.S. PATENT DOCUMENTS

| | | | |
|---|---|---|---|
| 1,655,640 | 1/1928 | Altfather et al. | 29/237 |
| 2,324,030 | 7/1943 | Schellin et al. | 29/237 |
| 4,189,817 | 2/1980 | Moebius | 29/237 |

FOREIGN PATENT DOCUMENTS 465451  5/1937  United Kingdom ................. 29/237

*Primary Examiner*—Mark Rosenbaum
*Assistant Examiner*—V. K. Rising
*Attorney, Agent, or Firm*—Arthur G. Yeager

[57] ABSTRACT

An apparatus for removing a metal fitting from a high pressure hose and reusing that fitting by applying it to another high pressure hose wherein the fitting comprises an inner sleeve which is inserted into the hollow of the hose and an outer sleeve which clamps the hose between it and the inner sleeve, the apparatus comprising a retainer plate which functions as a fixed seat for the outer sleeve of the fitting, the retainer plate having a bore and a counterbore, the bore having a diameter at least as large as the outside diameter of the inner sleeve and a counterbore having a diameter substantially the same as the outside diameter of the outer sleeve; a push plate adapted to push against a said inner sleeve; and a means of moving the push plate through a linear distance sufficient to disassemble or assemble a fitting on a high pressure hose.

25 Claims, 7 Drawing Figures

APPARATUS FOR REUSING HIGH PRESSURE HOSE FITTINGS

BACKGROUND OF THE INVENTION

High pressure hose; such as that employed in hydraulic power systems on machinery of all types, normally is made of a flexible elastomeric composition which includes strands of metallic wire embedded in the wall of the hose to provide the strength necessary to withstand the high pressures generated in the system. At each end of the hose there is a metallic fitting which permits the hose to be attached to a mechanism to which the high pressure hydraulic fluid must be transmitted. After some period of use the flexible hose may become worn and must be replaced. In the past it has been necessary to replace the worn hose with a new length of hose having new fittings on both ends. The fittings on the worn hose might be reclaimed by the manufacture and used again after appropriate reworking, but it has not been possible for the consumer to reuse those fittings. The fittings are specially designed steel articles and obviously are expensive. Thus the purchase of an entirely new length of high pressure hose with new fittings is a considerable expense as compared to the expense of merely replacing the hose itself and reusing the fittings.

It is an object of this invention to provide an apparatus that will permit fittings from used high pressure hose to be removed therefrom and applied to another piece of hose. It is another object of this invention to provide a simple, inexpensive apparatus that will permit a consumer to remove fittings from high pressure hose and to apply those fittings to another piece of hose. Still other objects will appear from the more detailed description of this invention which follows.

BRIEF SUMMARY OF THE INVENTION

This invention provides an apparatus for removing a fitting from a high pressure hose and reinstalling that fitting on a high pressure hose wherein the fitting comprises an inside sleeve and an outside sleeve adapted to be joined together compressing the hose therebetween, said apparatus comprising a rigid frame; an hydraulic cylinder, piston, and piston rod combination with said cylinder affixed to said frames; a coupling releasably attached to said piston rod, said coupling comprising a hollow member positioned with its longitudinal axis generally along the axis of said piston rod, and adapted to receive internally the outlet flange of said fitting, said coupling having attached thereto a removable push plate whereby the movement of said piston rod is transmitted directly to said push plate; a retainer plate fixed with respect to said frame and containing a central bore and counterbore generally positioned with the axis of said bore and counterbore along the extended axis of said piston rod, said counterbore having a diameter substantially the same as the outside diameter of said outer sleeve, said bore having a diameter not less than the outside diameter of said inner sleeve. In a specific embodiment of this invention, wherein the apparatus is employed to disassemble a fitting from a hose, a push plate contacts a pin slideably inserted into the hollow of the hose and having a diameter greater than the inside diameter of the inner sleeve. In another specific embodiment of this invention, wherein the apparatus is employed to assemble the fitting onto a high pressure hose, the push plate has a central bore which is smaller in diameter than the outside diameter of the inner sleeve and is large enough to at least partially encircle a neck portion of the fitting adjoining the forward end of the inner sleeve.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
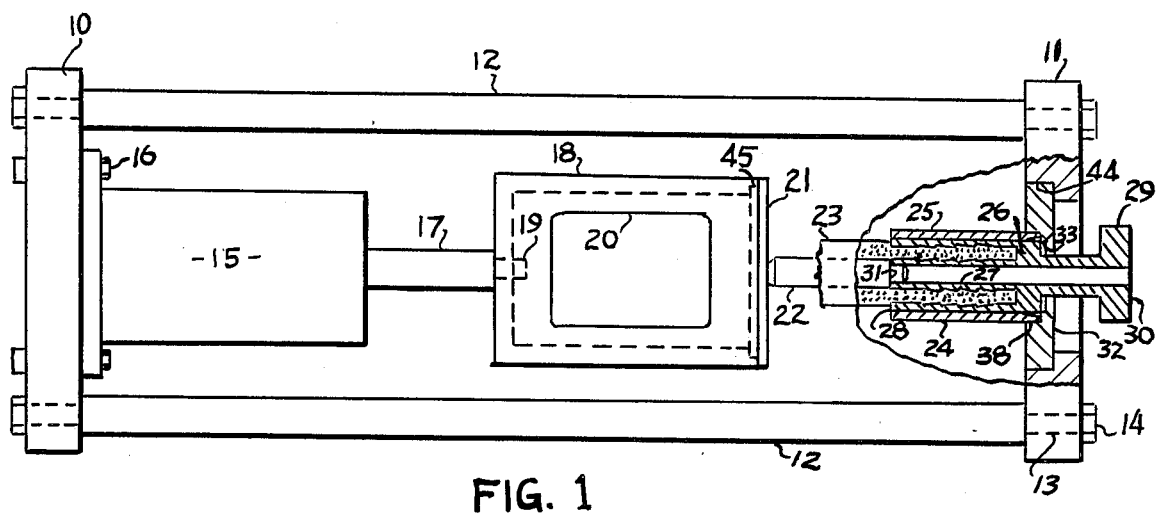
FIG. 1 is a top plan view of the apparatus of this invention as it is employed to dissemble a fitting on a high pressure hose.
Figure 2:
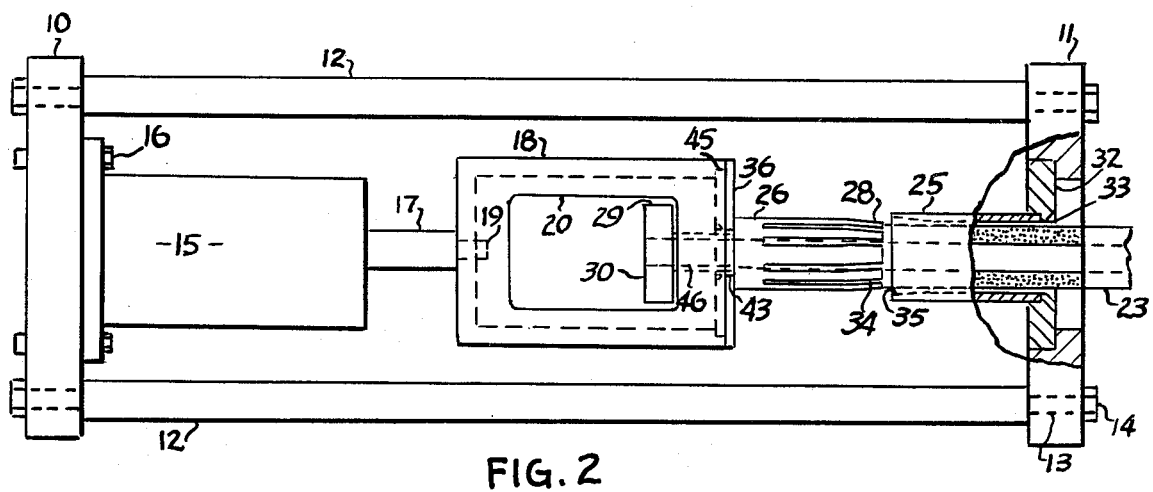
FIG. 2 is a top plan view of the apparatus of this invention as it is used in assembling the fitting on a high pressure hose.

The apparatus of this invention is illustrated in FIGS. 1 and 2. The apparatus includes a rigid frame which may be of any convenient design and shape. In these drawings the frame comprises a first end plate 10 and a second end plate 11 spaced apart and held rigidly in position by four tie rods 12 having threaded portions 13 to which nuts 14 are attached. Retainer plate 32 is seated in a recess 44 of end plate 11. Retainer plate 32 has a central bore 33 and a counterbore 38 which combine to form a seat for outer sleeve 25 of fitting 24. Counter bore 38 is substantially the same diameter as the outside diameter of outer sleeve 25 and the juncture with bore 33 forms a shoulder against which the forward end of outer sleeve 25 rests.

Pin 22 is inserted into the hollow of hose end 23 with a loose fit which permits the pin to slide easily therein. The diameter of pin 22 is greater than the inside diameter of central tube 27 of inner sleeve 26. A convenient way to center pin 22 in central tube 27 is by means of a shoulder 31 on the forward end of pin 22 with the forward end inserted inside of central tube 27 and the main body of pin 22 bearing against the rearward end of central tube 27. Push plate 21 works in conjunction with pin 22 to provide the necessary force to move pin 22 toward retainer plate 32 and thereby to separate inner sleeve 26 from outer sleeve 25. The force necessary to provide movement to pin 22 is provided by hydraulic cylinder 15 which is affixed to first end plate 10 by bolts 16. Piston rod 17 is forced outwardly from cylinder 15 when a suitable pressure is applied to the hydraulic fluid inside the cylinder behind the piston to which piston rod 17 is attached. The means for supplying hydraulic fluid under high pressure to cylinder 15 is not shown in these drawings since it involves conventional equipement and connections. Piston rod 17 is connected to push tube 18 which is a hollow member, preferably cylindrical. The rearward end of push tube 18 is connected in any convenient manner to piston rod 17, for example by a slot in push tube 18 to fit a reduced head 19 of piston rod 17. Head 19 may be fitted with a cotter pin, threaded and fitted with a nut, or connected to tube 18 by any other conventional fastening means if desired. The forward end of push tube 18 is designed to hold push plate 21 so that the movement of piston rod 17 is directly transmitted to push plate 21 and thence to pin 22. Push plate 21 is removably attached to the forward end of push tube 18 so that different types and sizes of various push plates 21 may be employed for different fittings in the same apparatus. A convenient means of attaching push plate 21 to push tube 18 is to prodvide a rabbet joint 45 on these two components with a fastening screw, if desired. In FIG. 1 it will be seen that the worn hose is cut off near fitting 24 to produce a hose end 23 so that the length of pin 22 can be reasonably short.

In FIG. 2 the apparatus of this invention is shown as used for the assembly of a fitting onto a high pressure hose. It will be seen that in this instance flange coupling 29 of the fitting is inside of push tube 18 while in the disassembly operation shown in FIG. 1 flange coupling 29 is outside of second end plate 11. Push tube 18 is provided with a cut out portion 20 in the wall of tube 18 to make this apparatus suitable for use with fittings where flange 29 is on an elbow, a tee, or other shape which is not a straight-line fitting. In the arrangement shown in FIG. 2 outer sleeve 25 is seated in retainer plate 32 in the same manner as described with respect to FIG. 1 except that the rearward end of outer sleeve 25 is seated therein in FIG. 2 while the forward end is shown seated therein in FIG. 1. Hose 23 extends from a position outward of end plate 11 through the hollow of outer sleeve 25 and into inner sleeve 26 in the space provided for it. In this instance pin 22 is not used and solid push plate 21 is replaced by a slotted push plate 36. The outer dimensions and shape of both push plates are the same so that they will fit properly into the rabbet joint 45 of push tube 18. Push plate 36 has central bore 43 which is smaller than the outside diameter of inner sleeve 26 and is larger than the outside diameter of neck portion 46 of fitting 24. As will be described more completely with respect to FIGS. 6 and 7 push plate 36 has a cut out portion extending from bore 43 to the outside edge of plate 36 to permit easy positioning of the component parts of the apparatus and the fitting for assembly of the fitting to hose 23.

Figure 3:
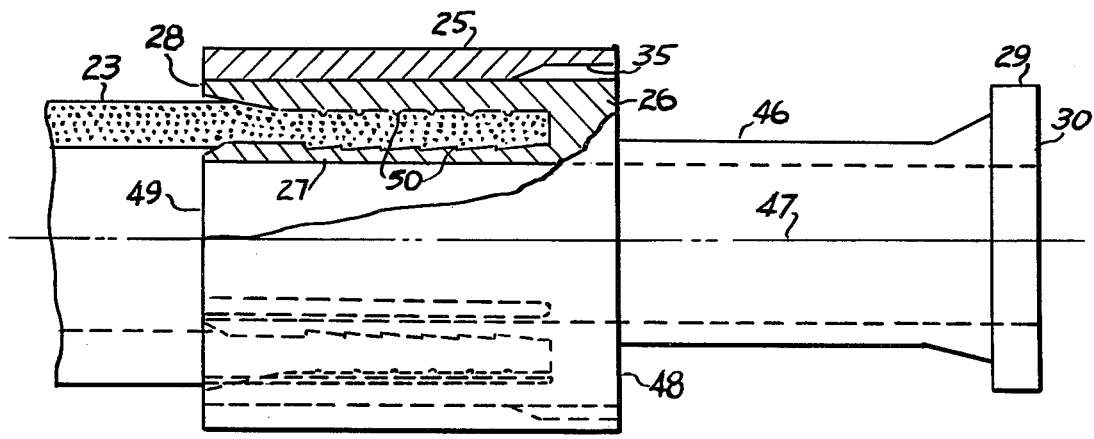
FIG. 3 is a partial cross sectional view of a high pressure hose and its assembled fitting which may be used in accordance with this invention.

An especially popular fitting for high pressure hose for hydraulic systems is a Caterpillar fitting generally illustrated in FIG. 3. This fitting comprises two separate sleeves, outer sleeve 25 and inner sleeve 26, the latter being integral with a coupling flange 29 and neck portion 46. In the illustration of this drawing the fitting is a straight line fitting wherein axis 47 extends in a straight line through hose 23 and fitting end 30. In other fittings the axis through fitting end 30 is angularly disposed with respect to the axis through hose 23 and it is for such fittings that cut out portion 20 of push tube 18 is employed as described above. Inner sleeve 26 has a central tubular portion 27 which is insertable into the hollow of hose 23 and concentric plurality of fingers 28 which are positionable over the outside of hose 23. These two portions of inner sleeve 26 are joined at forward end 48 and are spaced apart from each other at rearward end 49. On the surfaces of central tube 27 and fingers 28 that contact hose are lateral toothlike ridges 50 which provide additional frictional contact for holding hose 23 in place. Outer sleeve 25 is a hollow tubular member having a tapered portion 35 on its inner surface adjacent forward end 48 which facilitates the sliding of outer sleeve 25 over inner sleeve 26 when assembling the fitting. When outer sleeve 25 is in place as shown in FIG. 3 it provides the compressive force necessary to clamp hose 23 tightly between central tube 27 and fingers 29 to produce the high pressure fitting characteristic of this structure.

Figure 4:
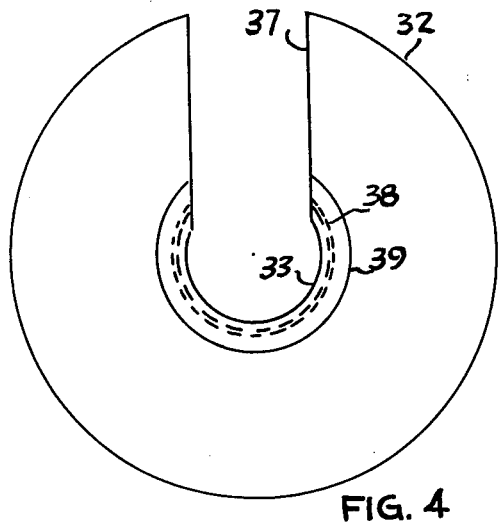
FIG. 4 is a top plan view of the retainer plate employed in the apparatus of this invention.
Figure 5:
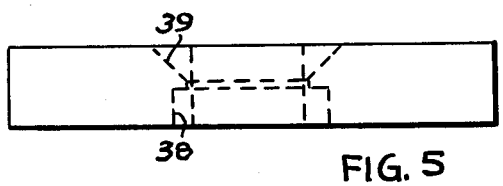
FIG. 5 is a front elevational view of the retainer plate of FIG. 4.

In FIGS. 4 and 5 retainer plate 32 is shown in some detail. A central bore 33 and counterbore 38 are the principal features of this plate. The combination of these two bores provide a seat for outer sleeve 25 when disassembling a previous fitting or assembling the fitting to a new hose. Counterbore 38 is substantially the same diameter as or slightly larger than, the outside diameter of outer sleeve 25 with sufficient tolerance to permit easy manual insertion of the sleeve into counterbore 38. Bore 33 has a diameter which is not less than the outside diameter of inner sleeve 26 and preferably with a slight tolerance to make that bore large enough for inner sleeve 26 to slide therethrough easily. The other features of retainer plate 32 are desirable but not critically necessary. Counter sink 39 is applied form the opposite side of plate 32 from counter bore 38 leaving a small shoulder at 33. This facilitates the positioning of the fitting and hose with respect to plate 32. A cut out portion 37 extends from bore 33 and counterbore 38 to the outside edge of plate 32 in a radial direction in order to facilitate the assembly of the hose and fitting components in the apparatus of this invention. Cutout portion 37 is slightly less in width than the diameter of bore 33 permitting hose 23 to be passed through cutout portion 37 with ease while retaining a stable seat for outer sleeve 25. It is to be understood that several retainer plates 32 would be necessary to service several different sizes of fittings although in each instance the general features would be similar but with different dimensions.

Figure 6:
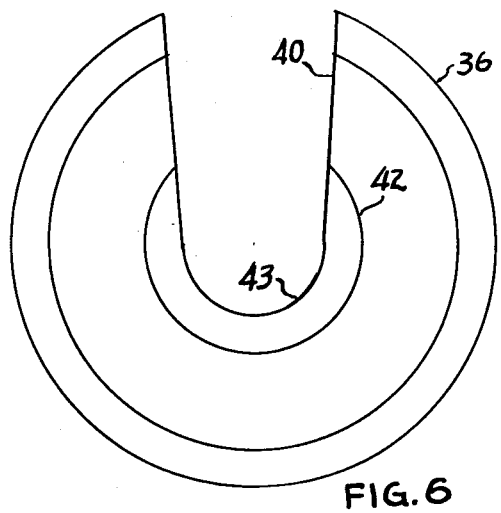
FIG. 6 is a top plan view of a push plate employed in this invention.
Figure 7:
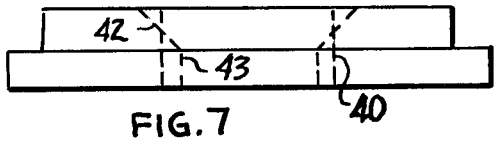
FIG. 7 is a front elevational view of the push plate of FIG. 6.

In FIGS. 6 and 7 there is shown slotted push plate 36 which is employed in the operation shown in FIG. 2 in assembling the fitting when using the apparatus of this invention. The outside edges of plate 36 are fashioned with a suitable shoulder 31 to provide a mating shape for rabbet joint 45 of FIG. 2. A central bore 43 in plate 36 is provided and has a diameter which is greater than neck portion 46 of the fitting adjacent inner sleeve 26 and is less than the outside diameter of the inner sleeve 26. The juncture between neck portion 46 and forward end 48 of inner sleeve 26 provides a shoulder on inner sleeve 26 against which push plate 36 can be contacted. For convenience a countersink 42 is provided on the opposite face of plate 36 from bore 43 to facilitate positioning the fitting when employing this plate. A cut out portion 40 extends from bore 43 to the outside edge of plate 36 to facilitate the positioning of inner sleeve 26 when assembling the fitting to a hose in accordance with this invention. In the preferred embodiment illustrated the width of cut out portion 40 is varied to form a tapered slot that diverges from 43 to the outer edge of plate 36.

In the operation of the apparatus of this invention a worn hose is cut off near a fitting which is to be removed, and the cut off hose and fitting is placed in the apparatus as shown in FIG. 1 with the fitting end 30 extending outwardly from end plate 11 and with the forward edge of outer sleeve 25 resting in counterbore 38 against the shoulder formed by bore 33. Pin 22 is inserted in the opposite end of the piece to be disassembled in the hollow of hose end 23 with shoulder 31 of pin 22 resting against the rearward edge of central tube 27 of inner sleeve 26. Solid push plate 21 is positioned in the forward end of push tube 18 and high pressure hydraulic fluid is applied to cylinder 15 to cause piston rod 17 to extend outwardly in the direction of retainer plate 32. The movement of piston rod 17 causes pin 22 to push inner sleeve 26 ahead of it and eventually to separate it from outer sleeve 25 which is held in a fixed position by retainer plate 32. When the fitting has been separated and hose end 23 is removed the cut end of a new hose 23 is inserted between fingers 28 and central tube 27. It may be necessary to bend fingers 28 outwardly to facilitate positioning of hose 23 properly in inner sleeve 26. Fingers 28 are then squeezed inwardly onto the outside of hose 23 so that the tips of fingers 28 can be easily inserted into tapered portion 35 of outer sleeve 25. Hose 23, with inner sleeve 26 lightly clamped thereon, is placed with fitting end 30 in push tube 18 and with slotted push plate 36 in place as shown in FIG. 2. Outer sleeve 25 while encircling hose 23, is positioned with its rearward end 49 in counterbore 38 resting against the shoulder formed by bore 33. High pressure hydraulic fluid forces piston rod 17 to move outwardly which, in turn, forces push plate 36 to move against the forward shoulder of inner sleeve 26 until inner sleeve 26 is completely inserted into outer sleeve 25 that is held in a fixed position by retainer plate 32. It may be seen that by merely changing the position of the fitting and hose and by selecting the appropriate type of push plate any similar fitting may be disassembled and reused on a new piece of flexible hose.

This invention also includes a method whereby the fitting is separated from a hose that may be worn and the same fitting is applied to another hose. The method involves holding either inner sleeve 26 or outer sleeve 25 fixed while moving the other sleeve so as to separate the two with the hose remaining clamped in the inner sleeve. The worn hose is then removed from the inner sleeve, which may require springing fingers 28 outwardly from central core 27 so as the free the hose end compressed therebetween. A new hose end is then inserted into inner sleeve 26 by positioning central core 27 inside the hollow of the hose and fingers 28 outside the hose with the hose end abutting against the juncture of fingers 28 and core 27 at forward end 48 of inner sleeve 26. The free ends of fingers 28 may have to be squeezed toward core 27 to lightly clamp hose in place and to permit fingers 28 to be inserted into outer sleeve 25. Either of sleeves 25 and 26 is then held in a fixed position while the other is moved sufficiently to cause outer sleeve 25 to completely cover fingers 28 as shown in FIG. 3. Preferably in each portion of this method outer sleeve 25 is held fixed while inner sleeve with hose 23 clamped therein is moved to separate the sleeves and subsequently to reassemble them.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An apparatus for applying a metal fitting to the end of a wire-reinforced elastomeric hose, said fitting comprising an elongated inner sleeve having opposite end portions with a flange coupling on one end and the other end portion extending inside said hose and an outer sleeve outside said hose, said sleeves compressing said hose therebetween to produce a high pressure hose and fitting combination, said apparatus comprising an elongated frame having a longitudinal axis, a retainer plate having a generally central bore through which said hose extends and forming a seat for said outer sleeve by dimensioning said central bore with a diameter at least as large as the outside diameter of said inner sleeve and a counterbore forming said seat with a diameter substantially the same as the outside diameter of said outer sleeve, means attached to said frame for holding said retainer plate fixed with said outer sleeve resting in said counterbore; a push plate having a generally central bore in alignment with said retainer plate central bore and in alignment with said longitudinal axis, said push plate central bore receiving said inner sleeve therethrough and having said flange coupling disposed remote from said retainer plte, said inner sleeve having a shoulder portion generally medially between said opposite end portions engaged by said push plate, said push plate being movably mounted on said frame and movable against said shoulder portion of said inner sleeve with said hose assembled thereto, and to position said inner sleeve for insertion into said outer sleeve, and means to move said push plate and said inner sleeve into said outer sleeve until the two sleeves are mated with said hose end tightly compressed and sandwiched therebetween to produce a high pressure hose and fitting combination.

2. The apparatus of claim 1, wherein said means to move said push plate includes a cylindrical member having at least one lateral cutout portion extending through the cylindrical wall thereof and past said central bore of said push plate when said cylindrical member engages said push plate, said cutout portion accommodating said flange coupling whether it be straight line or other than straight line.

3. The apparatus of claim 2 wherein said cutout portion extends twice through said cylindrical wall for accommodating a tee flange coupling.

4. The apparatus of claim 1 wherein said retainer plate has a radial cutout portion extending from said central bore and counterbore to the outer edge of said plate, said cutout protion having a width slightly less than the diameter of said bore.

5. The apparatus of claim 1 wherein said inner sleeve includes a neck portion adjacent said flange coupling, said push plate central bore being less than the outside diameter of said other end portion of said inner sleeve and larger than the outside diameter of said neck poriton.

6. The apparatus of claim 1 wherein said means to move said push plate includes a hydraulic cylinder in general alignment with said central bores of said retainer and push plates.

7. The apparatus of claim 6 wherein said means to move said push plate includes a hollow cylindrical member releasably attached to the piston rod of said hydraulic cylinder with the longitudinal axis of said member generally in alignement with said central bores and the axis of said piston rod.

8. The apparatus of claim 7 wherein said push plate and said cylindrical member are attached by a rabbet joint.

9. An apparatus for removing the metal fitting from a high pressure hose wherein said fitting comprises an outer sleeve and an inner sleeve with a flexible, wire-reinforced elastomeric hose compressed therebetween, said apparatus comprising a retainer plate adapted to partially encircle said fitting and hose and to provide a seat for the forward end of said outer sleeve in a counterbore in said retainer plate having a diameter substantially the same as the outside diameter of said outer sleeve and a bore having a diameter at least as large as the outside diameter of said inner sleeve; a pin having a body that is loosely slideable in the hollow of said hose and has a diameter greater than the inside diameter of said inner sleeve, said pin having a forward portion with a diameter less than the inside diameter of said inner sleeve; said body and said forward portion being joined by a shoulder adapted to rest against the rearward end of said inner sleeve; and a means to hold said outer sleeve seated in said retainer plate in a fixed position while pushing said pin against said rearward end of said inner sleeve until said inner sleeve is separated from said outer sleeve of said fitting and hose.

10. The apparatus of claim 9 wherein said means for pushing said pin includes an hydraulic cylinder with the movement of its piston rod transmitted to said pin.

11. The apparatus of claim 10 wherein said piston rod is directly connected to one end of a hollow cylindrical member and the other end of said member is closed with a plate that is in contact with the rearward end of said pin.

12. The apparatus of claim 9 wherein said means includes a rigid frame having a seat for said retainer plate.

13. The apparatus of claim 9 wherein said retainer plate has a radial cutout portion extending from said bore and said counterbore to the outside edge of said plate, said cutout portion having a width slightly less than the diameter of said bore.

14. The apparatus of claim 11 wherein said other end has a rabbet joint configuration and is closed with a removable plate which mates with said rabbet joint.

15. An apparatus for removing a fitting from a high pressure hose and for reinstalling said fitting on a high pressure hose, wherein said fitting comprise an inner sleeve and an outer sleeve adapted to be joined together compressing said hose therebetween; said apparatus comprising a rigid frame; an hydraulic cylinder, piston, and piston rod combination with said cylinder affixed to said frame; a coupling releasably attached to said piston rod, said coupling comprising a hollow member positioned with its longitudinal axis generally along the axis of said piston rod, and adapted to receive internally the outlet flange of said fitting, said coupling having attached thereto a removable push plate whereby the movement of said piston rod is transmitted directly to said push plate; a retainer plate fixed with respect to said frame and containing a central bore and counterbore generally positioned with the axis of said bore and counterbore along the extended axis of said piston rod, said counterbore having a diameter substantially the same as the outside diameter of said outer sleeve, said bore having a diameter not less than the outside diameter of said inner sleeve.

16. The apparatus of claim 15 wherein said retainer plate has a radial cutout portion extending from said bore and said counterbore to the edge of said plate, the width of said cutout portion being slightly less than the diameter of said bore.

17. The apparatus of claim 15 wherein said push plate is a solid plate bearing against a pin inside said hose in contact with the rearward end of said inner sleeve.

18. The apparatus of claim 15 wherein said push plate has a central bore which is smaller in diameter than the outside diameter of said inner sleeve and is large enough to at least partially encircle a neck portion of said adjoining the forward end of said inner sleeve.

19. The apparatus of claim 18 wherein said push plate has a cutout portion extending from said bore to the edge of said push plate, said cutout portion having a width at least as large as the outside diameter of said neck portion.

20. An apparatus for removing the metal fitting from a high pressure hose wherein said fitting comprises an outer sleeve and an elongated inner sleeve having a flange coupling adjacent one end portion and an opposite end portion and a flexible, wire-reinforced elastomeric hose compressed between said outer sleeve and said opposite end portion of said inner sleeve, said apparatus comprising a retainer plate adapted to partially encircle said fitting and hose and to provide a seat for the forward end of said outer sleeve in a counterbore in said retainer plate having a diameter substantially the same as the outside diameter of said outer sleeve, said retainer plate having a generally central bore of a diameter at least as large as the outside diameter of said inner sleeve; an enlongated pin having a body portion that is loosely slideable in the hollow of said hose, said pin body portion being of a diameter greater than the inside diameter of said opposite end portion of said inner sleeve, said pin body portion being reduced adjacent a forward portion to a diameter less than the inside diameter of said inner sleeve and forming a shoulder adapted to engage said opposite end portion of said inner sleeve; and means to maintain said outer sleeve seated in said retainer plate in a fixed position and pushing said pin against said opposite end portion of said inner sleeve until said inner sleeve is separated from said outer sleeve of said fitting and hose.

21. The apparatus of claim 20 wherein said means includes a hydraulic cylinder with the movement of its piston rod transmitted to said pin.

22. The apparatus of claim 21 wherein said piston rod is directly connected to one end of a hollow cylindrical member and the other end of said cylindrical member is closed with a push plate that is in contact with the rearward end of said pin.

23. The apparatus of claim 22 wherein said other end of said cylindrical member has a rabbet joint configuration with said push plate which is removably mounted by said rabbet joint to said other end.

24. The apparatus of claim 20 wherein said means includes a rigid frame having a seat for said retainer plate.

25. The apparatus of claim 20 wherein said retainer plate has a radial cutout portion extending from said bore and said counterbore to the outside edge of said plate, said cutout portion having a width slightly less than the diameter of said central bore.

* * * * *